US010152222B2

(12) United States Patent
Ozawa et al.

(10) Patent No.: US 10,152,222 B2
(45) Date of Patent: Dec. 11, 2018

(54) DIGITAL IMAGE PROCESSING DEVICE AND ASSOCIATED METHODOLOGY OF PERFORMING TOUCH-BASED IMAGE SCALING

(75) Inventors: Hiroyuki Ozawa, Tokyo (JP); Yuji Saitou, Tokyo (JP); Nobuki Furue, Tokyo (JP); Shinichi Iriya, Tokyo (JP); Ayako Iwase, Tokyo (JP)

(73) Assignee: SONY CORPORATION, Tokyo (JP)

( * ) Notice: Subject to any disclaimer, the term of this patent is extended or adjusted under 35 U.S.C. 154(b) by 315 days.

(21) Appl. No.: 13/002,524

(22) PCT Filed: May 6, 2010

(86) PCT No.: PCT/JP2010/003118
§ 371 (c)(1),
(2), (4) Date: Jan. 4, 2011

(87) PCT Pub. No.: WO2010/134275
PCT Pub. Date: Nov. 25, 2010

(65) Prior Publication Data
US 2011/0109581 A1 May 12, 2011

(30) Foreign Application Priority Data
May 19, 2009 (JP) ................................ 2009-121106

(51) Int. Cl.
*G06F 3/0488* (2013.01)
*G06F 3/0481* (2013.01)
*H04N 5/232* (2006.01)

(52) U.S. Cl.
CPC ........ *G06F 3/04883* (2013.01); *G06F 3/0481* (2013.01); *H04N 5/23216* (2013.01); *G06F 2203/04806* (2013.01)

(58) Field of Classification Search
CPC ............... G06F 3/0481; G06F 3/04883; G06F 2203/04806; H04N 5/23216
(Continued)

(56) References Cited

U.S. PATENT DOCUMENTS 5,903,229 A 5/1999 Kishi
7,696,998 B2 * 4/2010 Bae .................. G06T 11/203
345/419
(Continued)

FOREIGN PATENT DOCUMENTS

JP 8-7120 1/1996
JP 9 230993 9/1997
(Continued)

OTHER PUBLICATIONS

International Search Report dated Aug. 3, 2010 in PCT/JP10/03118 filed May 6, 2010.
(Continued)

*Primary Examiner* — Vinh T Lam
(74) *Attorney, Agent, or Firm* — Oblon, McClelland, Maier & Neustadt, L.L.P.

(57) ABSTRACT

A digital image processing device is provided that improves operability when performing a scaling up/scaling down operation. Based on a single trajectory when a touch position on a display screen of a display portion moves, a center point and ratio used to scale up or scale down the image are set. In this way, for example, it is possible to scale up and scale down the image by an easy touch operation of simply tracing the trajectory with a single finger (namely, by a single-touch operation).

37 Claims, 14 Drawing Sheets

ZOOM IN OPERATION (1) IN ACCORDANCE WITH TOUCH OPERATION

(58) Field of Classification Search
USPC .................................. 345/173–184; 715/563
See application file for complete search history.

(56) References Cited

U.S. PATENT DOCUMENTS

| | | | | |
|---|---|---|---|---|
| 7,701,457 | B2* | 4/2010 | Bae | G06T 11/203 345/419 |
| 7,750,911 | B2* | 7/2010 | Bae | G06T 11/203 345/179 |
| 8,159,465 | B2* | 4/2012 | Stallings | G06F 3/04883 345/173 |
| 8,238,662 | B2* | 8/2012 | Banerjee | G06F 3/04845 382/174 |
| 2006/0232611 | A1 | 10/2006 | Brooke | |
| 2006/0288313 | A1* | 12/2006 | Hillis | G06F 3/04883 715/863 |
| 2007/0220431 | A1* | 9/2007 | Nakamura | G06F 17/30749 715/716 |
| 2007/0252821 | A1* | 11/2007 | Hollemans | G06F 3/0416 345/173 |
| 2008/0024500 | A1* | 1/2008 | Bae | G06T 11/203 345/442 |
| 2008/0034289 | A1* | 2/2008 | Doepke | G06F 3/04812 715/700 |
| 2008/0036771 | A1* | 2/2008 | Bae | G06T 11/203 345/442 |
| 2008/0036772 | A1* | 2/2008 | Bae | G06T 11/203 345/442 |
| 2008/0036773 | A1* | 2/2008 | Bae | G06T 11/203 345/442 |
| 2008/0122796 | A1* | 5/2008 | Jobs | G06F 3/0488 345/173 |
| 2008/0204476 | A1* | 8/2008 | Montague | G06F 3/04845 345/661 |
| 2009/0022394 | A1* | 1/2009 | Banerjee | G06F 3/04845 382/164 |
| 2009/0085936 | A1 | 4/2009 | Chen et al. | |
| 2009/0153475 | A1* | 6/2009 | Kerr | H04N 5/4403 345/157 |
| 2009/0178008 | A1* | 7/2009 | Herz | G06F 3/04817 715/840 |
| 2009/0201261 | A1* | 8/2009 | Day | G06F 3/04883 345/173 |
| 2009/0265670 | A1* | 10/2009 | Kim | G06F 3/04883 715/863 |
| 2009/0300554 | A1* | 12/2009 | Kallinen | G06F 3/04883 715/863 |
| 2009/0322700 | A1* | 12/2009 | D'Souza | G06F 3/045 345/174 |
| 2010/0020103 | A1* | 1/2010 | Ure | G06F 1/1624 345/660 |
| 2010/0026643 | A1 | 2/2010 | Ozawa et al. | |
| 2010/0026649 | A1* | 2/2010 | Shimizu | G06F 3/04883 345/173 |
| 2010/0037135 | A1 | 2/2010 | Iwase et al. | |
| 2010/0156806 | A1* | 6/2010 | Stallings | G06F 3/04883 345/173 |
| 2010/0229130 | A1* | 9/2010 | Edge | G06F 3/04883 715/863 |
| 2010/0253686 | A1* | 10/2010 | Alsbury | G06T 11/206 345/440 |
| 2010/0289754 | A1* | 11/2010 | Sleeman | G06F 3/0416 345/173 |
| 2010/0315438 | A1* | 12/2010 | Horodezky | G06F 3/0481 345/661 |
| 2015/0205499 | A1* | 7/2015 | Freeman | G06F 3/04845 715/711 |

FOREIGN PATENT DOCUMENTS

| | | |
|---|---|---|
| JP | 2002-281365 A | 9/2002 |
| JP | 2004 280745 | 10/2004 |
| JP | 2008 134918 | 6/2008 |
| JP | 2008 299474 | 12/2008 |
| JP | 2010-136187 | 6/2010 |
| WO | 2009/028892 A2 | 3/2009 |

OTHER PUBLICATIONS

Office Action dated Apr. 16, 2013 in Japanese Patent Application No. 2009-121106 filed May 19, 2009.

Office Action dated May 13, 2014 in Japanese Patent Application No. 2013-148352.

Office Action dated Jul. 22, 2014 in Japanese Application No. 2013-148352.

Extended European Search Report dated Jul. 14, 2014 in European Application No. 10777515.7.

Korean Office Action dated Feb. 2, 2016 in Patent Application No. 10-2010-7029768 (with English translation).

\* cited by examiner

CONFIGURATION OF INFORMATION PROCESSING
DEVICE THAT IS OUTLINE OF FIRST EMBODIMENT

EXTERNAL CONFIGURATION OF DSC
(DIGITAL STILL CAMERA)

DISPLAY OF MONITORING IMAGE

ZOOM IN OPERATION (1) IN
ACCORDANCE WITH TOUCH OPERATION

CALCULATION OF RADIUS, CENTER POINT
AND CENTER ANGLE OF CIRCLE FROM
TRAJECTORY OF TOUCH POSITION

ZOOM PROCESS PROCEDURE

ZOOM IN OPERATION (1) IN ACCORDANCE WITH
TOUCH OPERATION OF SECOND EMBODIMENT

ZOOM IN OPERATION (2) IN ACCORDANCE WITH
TOUCH OPERATION OF SECOND EMBODIMENT

CHANGES IN ZOOM WHEN SIZE AND CENTER OF CIRCLE ARE CHANGED

FIG.12
12a
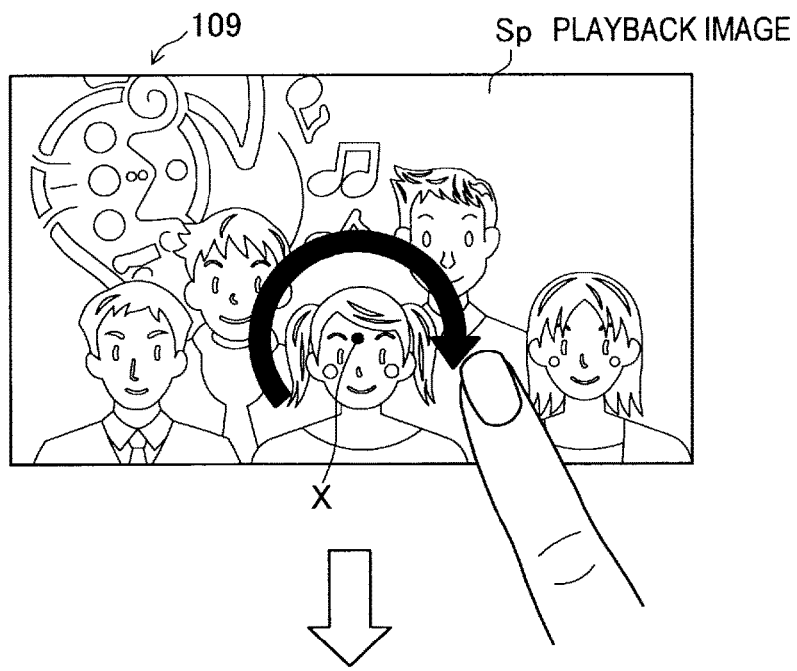
12b
SCALE UP INSIDE
CIRCLE ONLY (SINGLE)
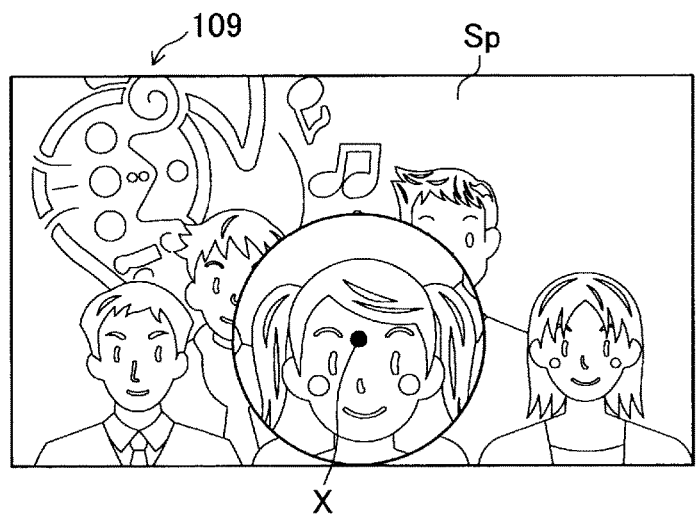
ZOOM IN OPERATION (1) IN ACCORDANCE WITH
TOUCH OPERATION OF OTHER EMBODIMENT

FIG.13
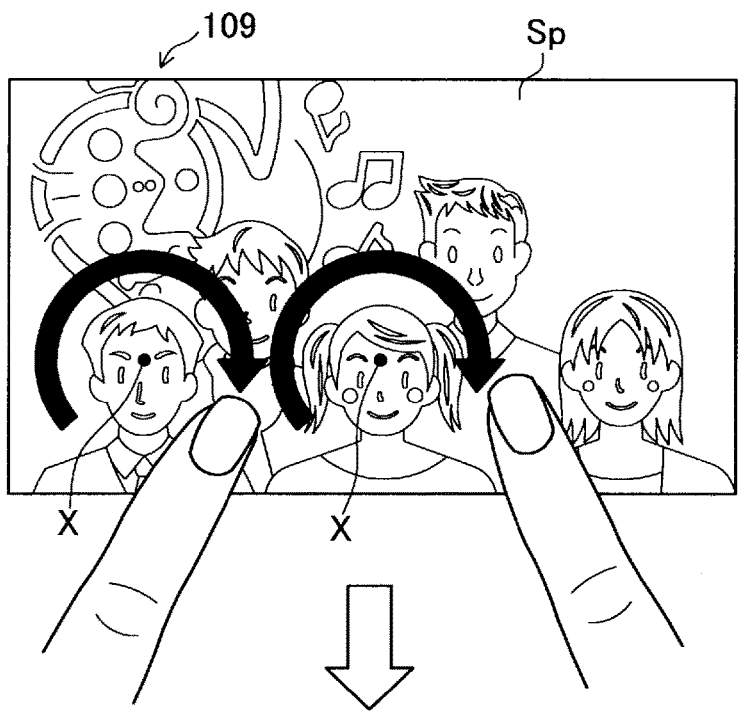
13a
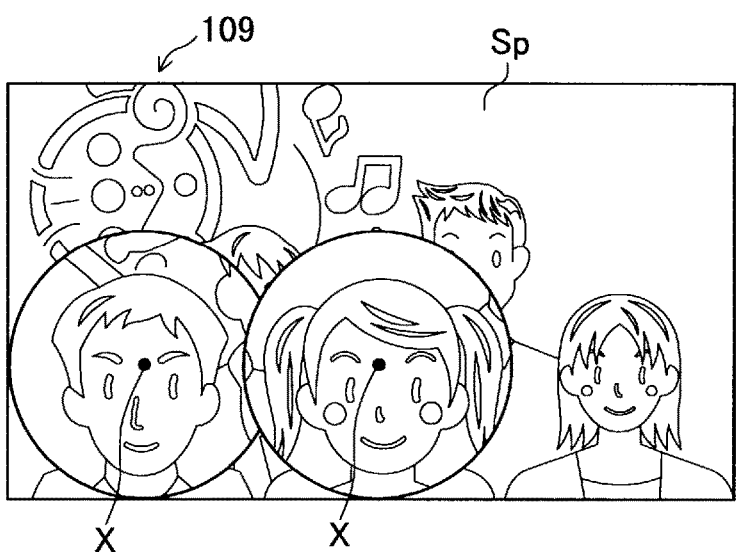
13b
SCALE UP INSIDE
CIRCLE ONLY
(MULTIPLE)
ZOOM IN OPERATION (2) IN ACCORDANCE WITH
TOUCH OPERATION OF OTHER EMBODIMENT

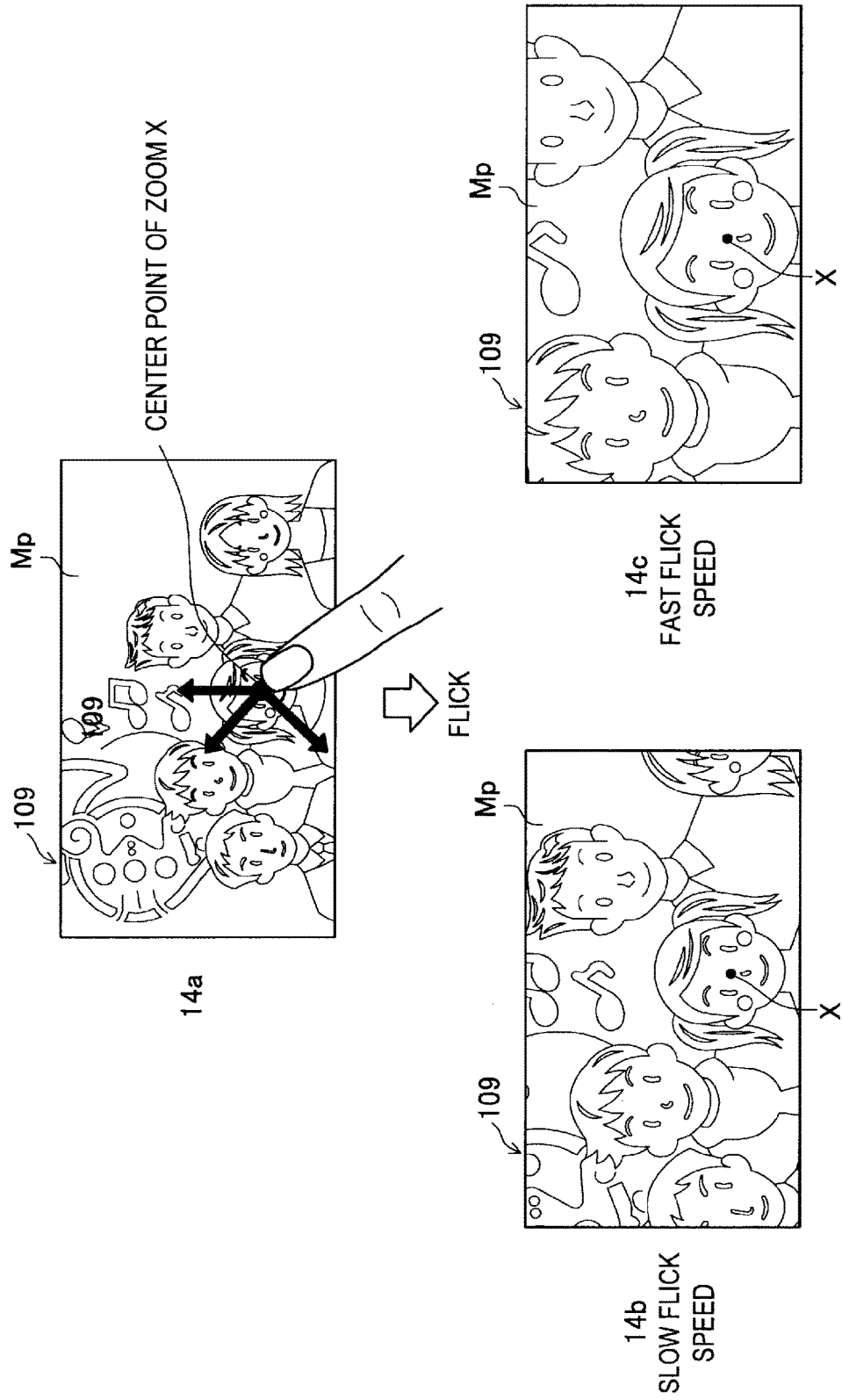

DIGITAL IMAGE PROCESSING DEVICE AND ASSOCIATED METHODOLOGY OF PERFORMING TOUCH-BASED IMAGE SCALING

TECHNICAL FIELD

An information processing device is provided that employs an image scaling feature for scaling a displayed image using a touch operation.

BACKGROUND ART

It is in known art that information processing devices may employ touch panels. With this type of information processing device, more intuitive operations are realized by using touch operations, such as tapping, dragging, flicking etc., on the touch panel. For example, flicking is an operation in which a surface of the touch panel is lightly flicked by a finger (a touch pen etc. is also possible).

Further, in recent years, information processing devices are also becoming more widespread that have a so-called multi-touch panel on which pinch out and pinch in operations etc. can be performed by simultaneously detecting touch positions in a plurality of locations. In this regard, the pinch out operation is an operation in which two fingers touch the touch panel and a space between the two fingers is widened. The pinch in operation is an operation in which the space between the two fingers is narrowed.

Note that, here, a touch operation realized by simultaneously detecting a plurality of touch positions is sometimes also referred to as a multi-touch operation, and a touch operation realized by detecting a single touch position in one time is sometimes also referred to as a single-touch operation.

It should be noted that, with the above-described multi-touch operation, although diverse touch operations can be performed, because a plurality of fingers are used, the operation becomes complex in comparison to single-touch operation.

SUMMARY OF INVENTION

The present invention addresses the issue described above and proposes an information processing device, an image scaling method and a program thereof that allow improved operability when performing a scaling up/scaling down operation.

A digital image processing device and associated methodology are provided, comprising a touch-screen display interface enables touch control to a user of the image processing device while displaying image data. An interface processor identifies a single touch gesture of the user applied to a surface of the touch-screen display. The single touch gesture designates an area of the displayed image data as a focal center of an image zoom operation.

In this way, based on the single touch trajectory when the touch position moves, the information processing device of the present invention sets the center point and the ratio used to scale the image. By doing this, the information processing device can, for example, scale up and scale down the image by an easy touch operation of simply tracing the trajectory with one finger (namely, by a single-touch operation).

According to the present invention, the image can be scaled up and scaled down by the easy operation of simply tracing the trajectory with the single finger (namely, by the single-touch operation). Thus, the information processing device, the image scaling method and the program thereof are realized that allow improved operability when performing the scaling up/scaling down operation.

BRIEF DESCRIPTION OF DRAWINGS

FIG. 12 is a schematic diagram showing a zoom in operation (1) in response to a touch operation according to another embodiment.

FIG. 13 is a schematic diagram showing a zoom in operation (2) in response to a touch operation according to another embodiment.

FIG. 14 is a schematic diagram showing a zoom in operation (3) in response to a touch operation according to another embodiment.

DESCRIPTION OF EMBODIMENTS

Hereinafter, exemplary embodiments of the invention (hereinafter referred to as the embodiments) will be explained.

1. First Embodiment

1.1 Outline of First Embodiment

First, an outline of a first embodiment will be explained. It should be noted that after the outline is explained, specific examples of the present embodiment will be explained.

Figure 1:
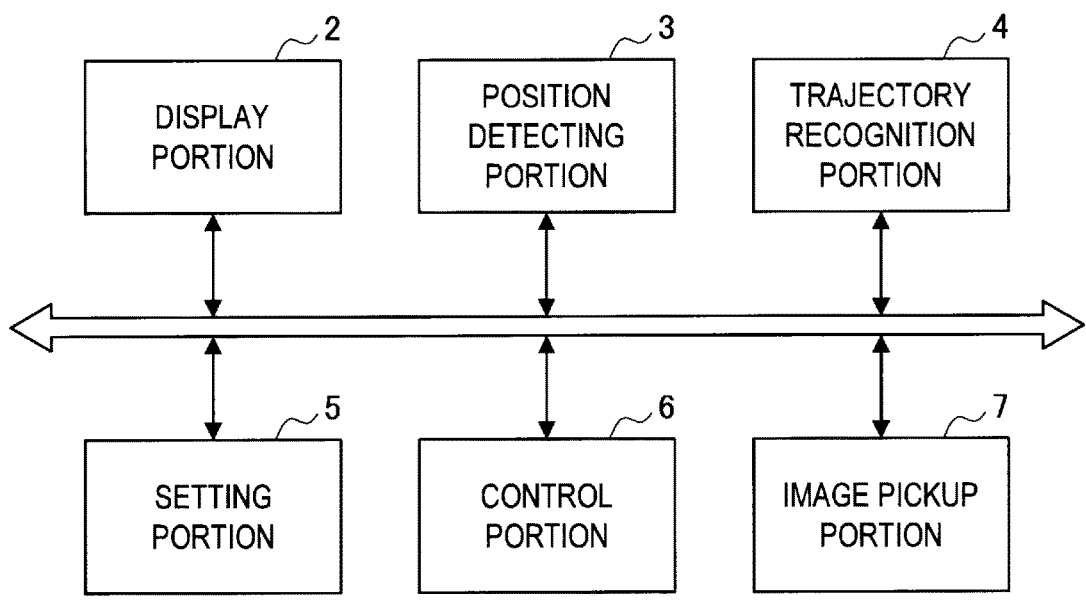
FIG. 1 is a high level block diagram showing a configuration of an information processing device of a first exemplary embodiment.

The reference numeral 1 in FIG. 1 indicates an information processing device. The information processing device 1 has a display portion 2 that displays images. Further, the information processing device 1 has a position detecting portion 3 that detects a touch position on a display screen of the display portion 2. In addition, the information processing device 1 has a trajectory recognition portion 4 that, when the touch position detected by the position detecting portion 3 moves, recognizes a single trajectory.

Additionally, the information processing device 1 has a setting portion 5 that, based on the single trajectory recognized by the trajectory recognition portion 4, sets a center point (focal center) and a ratio that are used to perform scaling of an image being displayed on the display portion 2. Furthermore, the information processing device 1 has a control portion 6 that, based on the settings made by the setting portion 5, scales up or scales down the image being displayed on the display portion 2.

With the above-described configuration, based on the single trajectory when the touch position moves, the information processing device 1 can perform scaling up or scaling down of the image with an easy touch operation (namely, a single touch operation) in which the trajectory is simply traced with one finger.

In addition, the information processing device 1 may have an image pickup portion 7. In this case, images picked up by the image pickup portion 7 are displayed on the display portion 2. Additionally, based on the single trajectory recognized by the trajectory recognition portion 4, the setting portion 5 sets a center point and a zoom ratio used to perform a zoom in or a zoom out operation.

Furthermore, based on the settings made by the setting portion 5, the control portion 6 causes the image being displayed on the display portion 2 to be scaled up or scaled down by performing zoom control.

With the above-described configuration, based on the single trajectory when the touch position moves, the information processing device 1 can perform zooming in or zooming out with an easy touch operation (namely, a single touch operation) in which the trajectory is simply traced with one finger.

Specific examples of the information processing device 1 with the above-described configuration will be explained in more detail below.

1.2 External Configuration of DSC (Digital Still Camera)

Figure 2A:
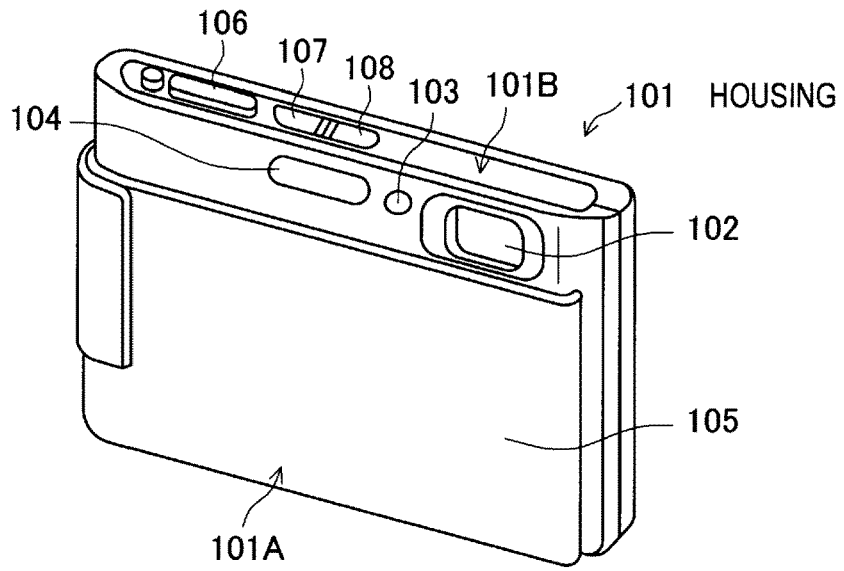
FIG. 2A is a perspective view showing an external configuration of a DSC (digital still camera) in accordance with FIG. 1.
Figure 2B:
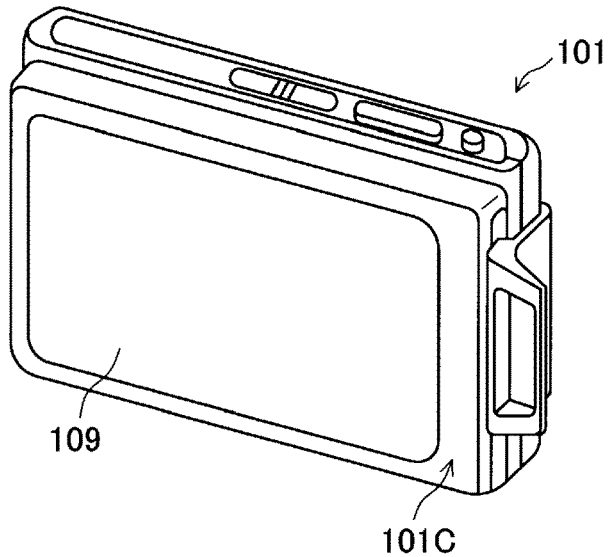
FIG. 2B is a second perspective view showing the external configuration of the DSC in accordance with FIG. 1.

Next, an external configuration of a DSC 100 that is a specific example of the above-described information processing device 1 will be described with reference to FIG. 2A and FIG. 2B.

The DSC 100 has a housing 101 that has a generally flat rectangular shape of a size that can roughly be held in one hand. A taking lens 102, an AF (Auto Focus) illuminator 103 and a flash 104 are provided on an upper portion of a front surface 101A of the housing 101. The AF illuminator 3 is also a self timer lamp.

Further, a lens cover 105 that can be slid in the up-down direction is provided on the front surface 101A. When the lens cover 105 is slid in the downward direction, the taking lens 102, the AF illuminator 103 and the flash 104 are exposed, while, when the lens cover 105 is slid in the upward direction, these members are protected by being covered.

Note that, with the DSC 100, a power source is automatically switched on when the lens cover 105 is slid in the downward direction.

In addition, a shutter button 106, a playback button 107 and a power source button 108 are provided on an upper surface 101B of the housing 101. Furthermore, a touch screen 109 is provided on a rear surface 101C of the housing 101.

The playback button 107 is a hardware key that switches an operating mode of the DSC 100 to a playback mode that displays on the touch screen 109 images that have been taken. The touch screen 109 is a display device on which touch operations are possible.

When the lens cover 105 is slid in the downward direction, or when the power source button 108 is depressed, the power source of the DSC 100 is switched on and a photo mode is activated.

Then, the DSC 100 displays an image that has been picked up via the taking lens 102 on the touch screen 109 as a monitoring image. In addition, the DSC 100 performs zooming in accordance with a touch operation on the touch screen 109. Then, when the shutter button 106 is depressed, the DSC 100 records an image.

Additionally, when the playback button 107 is depressed, the DSC 100 switches to the playback mode. When this happens, the DSC 100 displays on the touch screen 109 a single image, for example, from among recorded images. Then the DSC 100 switches the displayed image in accordance with a touch operation on the touch screen 109.

1.3 Hardware Configuration of DSC (Digital Still Camera)

Figure 3:
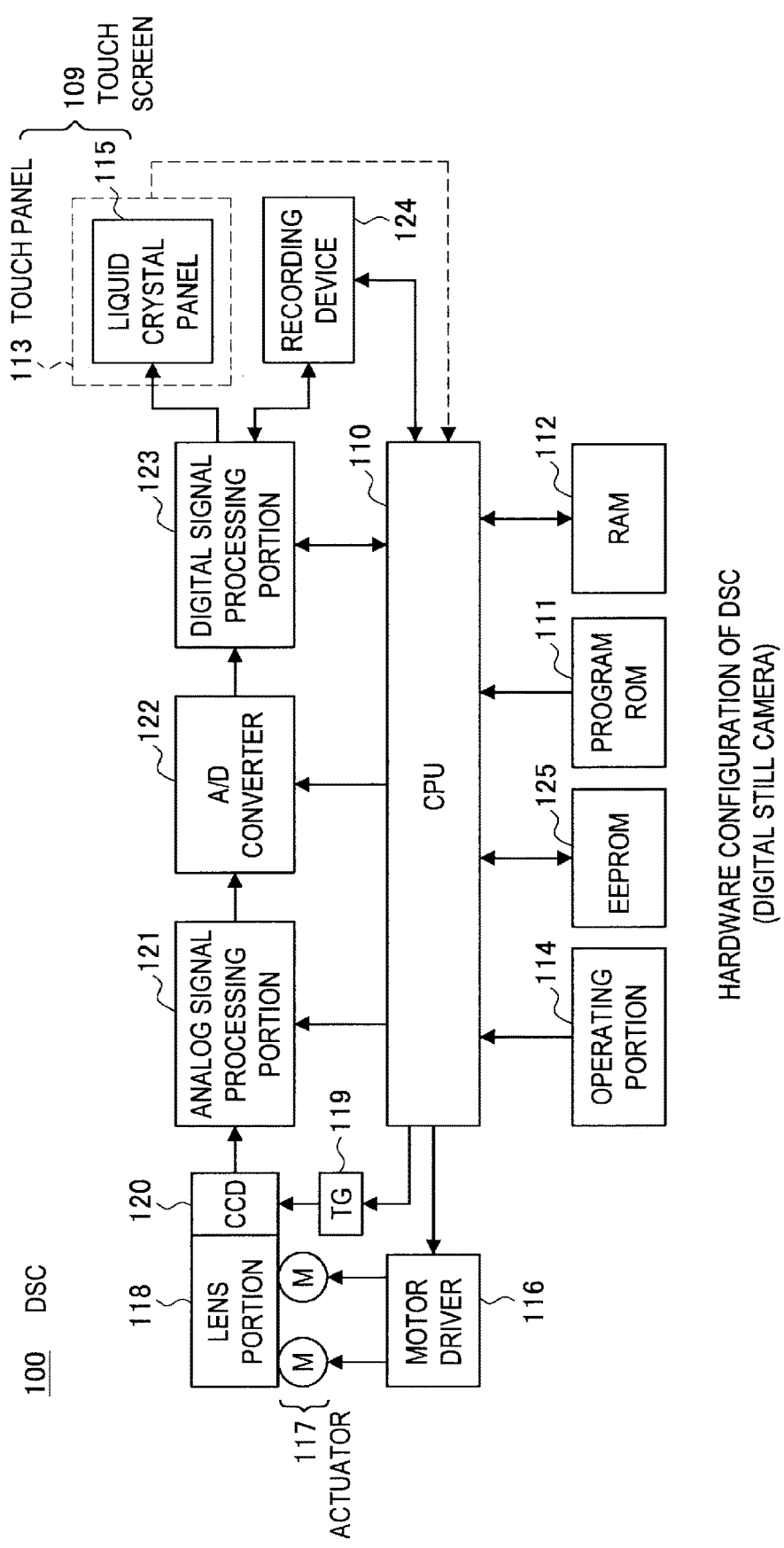
FIG. 3 is a block diagram illustrating a hardware configuration of the DSC of FIGS. 2A-2B.

Next, a hardware configuration of the DSC 100 will be explained with reference to FIG. 3. In the DSC 100, a CPU 110 performs various processes by downloading onto a RAM 112 programs written into a program ROM 111 and executing the programs, and also controls each portion in accordance with input signals from a touch panel 113 and an operating portion 114. Note that CPU is an abbreviation of Central Processing Unit. ROM is an abbreviation of Read Only Memory, and RAM is an abbreviation of Random Access Memory.

The touch panel 113 is a device that, together with a liquid crystal panel 115, forms the above-described touch screen 109. By touching with a finger a selected position on the touch panel 113, coordinates of the touched position (namely, the touch position) are detected. Then, the touch panel 113 transmits to the CPU 110 an input signal indicating the coordinates of the touch position.

Note that, during a period in which the touch panel 113 is continuously touched, such as when a drag operation is being performed etc., the input signal indicating the coordinates of the touch position is periodically transmitted to the CPU 110 at a certain time interval.

When the CPU 110 acquires the coordinates of the touch position from the input signal transmitted from the touch panel 113, it converts the acquired coordinates to screen coordinates of the liquid crystal panel 115, and thus recognizes which position has been touched on the liquid crystal panel 115.

Furthermore, by sequentially converting the coordinates of the touch position, which are acquired from the input signal transmitted periodically at the certain time interval, to the screen coordinates of the liquid crystal panel 115, the CPU 110 recognizes in what manner the touch position has moved (namely, recognizes a trajectory of the touch position).

Then, based on the touch position and the trajectory of the touch position recognized in this way, the CPU 110 determines what kind of touch operation has been performed at which position on the screen.

The operating portion 114 is a device formed of the shutter button 106, the playback button 107 and the power source button 108 described above and transmits to the CPU 110 an input signal in accordance with operation of these buttons.

Based on the input signal transmitted from the operating portion 114, the CPU 110 determines which of the shutter button 106, the playback button 107 and the power source button 108 has been operated.

In actuality, when the power source button 108 of the operating portion 114 is depressed and the power source is switched on, or when an instruction is received to switch the operating mode to the photo mode by touch operation of the touch panel 113, the CPU 110 operates in the photo mode.

At this time, the CPU 110 controls a motor driver 116 such that an actuator 117 is driven, and thus causes a lens portion 118, which includes the taking lens 102 and the AF illuminator 103 etc. described above, to be exposed from the housing 101 of the DSC 100. In addition, by driving the actuator 117, the CPU 110 adjusts an aperture of the lens portion 118, changes a zoom ratio of an optical zoom and moves a focus lens etc.

At that time, the CPU 110 controls a timing generator 119 and supplies a timing signal to an image pickup element 120 that is formed of a CCD (Charge Coupled Device) or the like. By operating based on the timing signal, the image pickup element 120 converts light from a photographic subject taken in via the lens portion 118 to an electrical signal (namely, performs photoelectric conversion), and transmits the electrical signal to an analog signal processing portion 121.

Based on control by the CPU 110, the analog signal processing portion 121 obtains an analog image signal by performing analog signal processing (amplification etc.) on the electrical signal, and transmits the analog image signal to an analog/digital converter (also sometimes referred to as an A/D converter) 122.

Based on control by the CPU 110, the A/D converter 122 obtains a digital image signal by performing analog/digital conversion (A/D conversion) on the transmitted analog image signal, and sends the digital image signal to a digital signal processing portion 123.

Based on control by the CPU 110, the digital signal processing portion 123 performs digital signal processing (elimination of noise etc.) on the transmitted digital image signal, and then transmits the processed signal to the liquid crystal panel 115. As a result, the image of the photographic subject is displayed on the liquid crystal panel 115 as the monitoring image. In this way, the DSC 100 causes a photographer to check the photographic subject.

Further, at this time, based on control by the CPU 110, the digital signal processing portion 123 generates a graphic signal, such as a button or icon, and superimposes the graphic signal on the digital image signal. As a result, a button or an icon etc. is displayed along with the monitoring image on the liquid crystal panel 115.

Furthermore, let us assume that zooming in or zooming out by touch operation of the touch panel 113 is instructed at this time. In this case, the CPU 110 performs zooming in or zooming out in accordance with the instruction.

Here, the CPU 110 can control the zoom ratio of the optical zoom by controlling the lens portion 118, and can control a zoom ratio of a digital zoom by controlling the digital signal processing portion 123.

In other words, in accordance with a zoom in or a zoom out instruction, the CPU 110 performs the zoom in or zoom out operation by controlling the zoom ratios of the optical zoom and the digital zoom.

As a result, the monitoring image being displayed on the liquid crystal panel 115 is scaled up (zoom in) or scaled down (zoom out).

Let us further assume that the shutter button 106 of the operating portion 114 is depressed at this time. In this case, the CPU 110 records an image in accordance with the operation.

At this time, based on control by the CPU 110, the digital signal processing portion 123 generates compressed image data, by compressing the digital image signal transmitted from the A/D converter 122 using a compression and decompression format, such as JPEG, for example. Note that JPEG is an abbreviation of Joint Photographic Experts Group.

The CPU 110 generates an image file by adding a file header etc. to the compressed image data generated by the digital signal processing portion 123.

Then, the CPU 110 records the image file onto a recording device 124. The CPU 110 records the image in this way.

Note that the recording device 124 is, for example, a non-volatile memory of around several gigabytes to several tens of gigabytes. The recording device 124 may be a recording medium that is built into the DSC 100 in advance, or it may be a recording medium that can be attached to/detached from the DSC 100, such as a memory card.

Separately to the recording device 124, the DSC 100 has an EEPROM (Electrically Erasable Programmable ROM) 125. The CPU 110 records onto the EEPROM 125 information that should be maintained after the power source is turned off, such as various pieces of information set by the user.

On the other hand, when the playback button 107 of the operating portion 114 is depressed, or when an instruction is received to switch the operating mode to the playback mode by touch operation of the touch panel 113, the CPU 110 operates in the playback mode.

The CPU 110, for example, reads one file (the image file with the most recent capture date, for example) among the image files recorded in the recording device 124, extracts the compressed image data from the image file and transmits the compressed image data to the digital signal processing portion 123.

Based on control by the CPU 110, the digital signal processing portion 123 obtains the pre-compression digital image signal by decompressing the transmitted compressed image data, and transmits the digital image signal to the liquid crystal panel 115. As a result, the played back image (also referred to as a playback image) is displayed on the liquid crystal panel 115.

Further, at this time, based on control by the CPU 110, the digital signal processing portion 123 generates a graphic signal, such as a button or icon, and superimposes the graphic signal on the digital image signal. As a result, a button or an icon etc. is displayed along with the playback image on the liquid crystal panel 115.

Furthermore, let us assume that scaling up or scaling down of the playback image is instructed by touch operation of the touch panel 113 at this time. In this case, in accordance with the instruction, the CPU 110 scales up or scales down the playback image being displayed on the liquid crystal panel 115 by controlling the digital signal processing portion 123.

Let us further assume that it is instructed to switch the playback image by touch operation of the touch panel 113. In this case, in accordance with the instruction, the CPU 110 reads the image file with a more recent or older capture date than the currently displayed playback image, extracts compressed image data from the image file, and transmits the compressed image data to the digital signal processing portion 123. As a result, the playback image displayed on the liquid crystal panel 115 is switched. The CPU 110 plays back the image in this way.

Note that, the lens portion 118 and the image pickup element 120 of the DSC 100 are hardware that corresponds to the image pickup portion 7 of the above-described information processing device 1. In addition, the liquid crystal panel 115 of the DSC 100 is hardware that corresponds to the display portion 2 of the information processing device 1. Furthermore, the touch panel 113 of the DSC 100 is hardware that corresponds to the position detecting portion 3 of the information processing device 1. Additionally, the CPU 110 of the DSC 100 is hardware that corresponds to the trajectory recognition portion 4, the setting portion 5 and the control portion 6 of the information processing device 1.

It should be noted that, when in the photo mode, the DSC 100 can perform zoom operations by touch operation of the touch screen 109 as described above.

Further, when in the playback mode, the DSC 100 can perform scaling up or scaling down of the playback image by touch operation of the touch screen 109.

Hereinafter, touch operations (also referred to as zoom operations) corresponding to this type of zoom (scaling up/scaling down) operation will be explained in more detail.

1.4 Zoom (Scaling Up/Scaling Down) Operations

The zoom operations in the photo mode and the scaling up/scaling down operations in the playback mode are similar touch operations, and the explanation mainly concentrates on the zoom operations in the photo mode.

Figure 4:
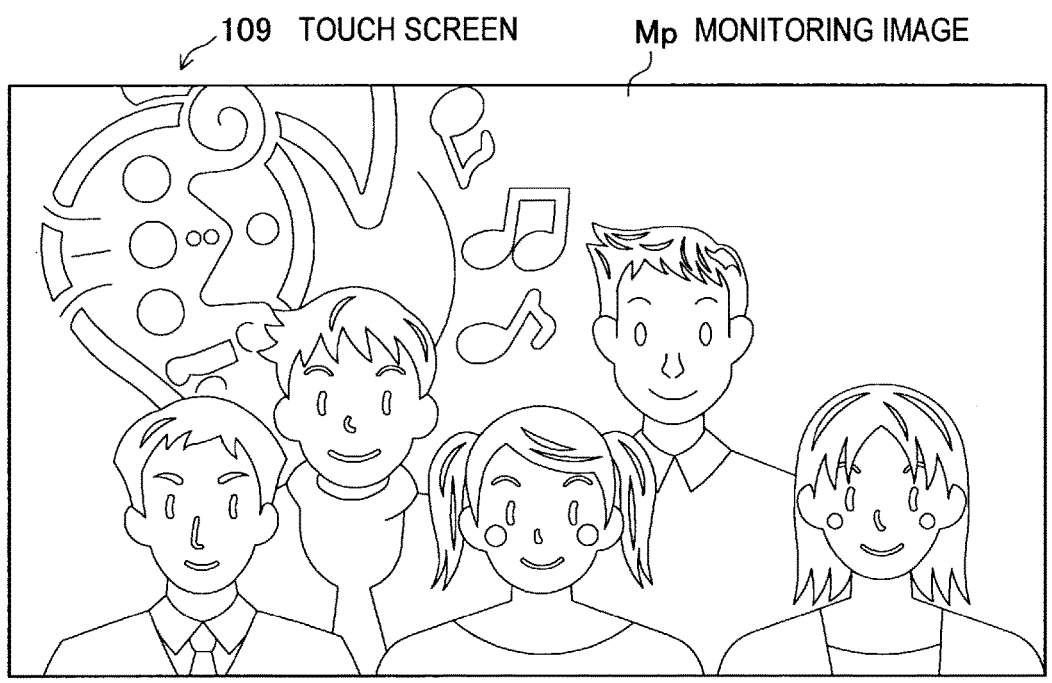
FIG. 4 is a schematic diagram illustrating a display of a monitoring image.

When switched to the photo mode, the CPU 110 displays a monitoring image Mp on the touch screen 109, as shown in FIG. 4.

Figure 5:
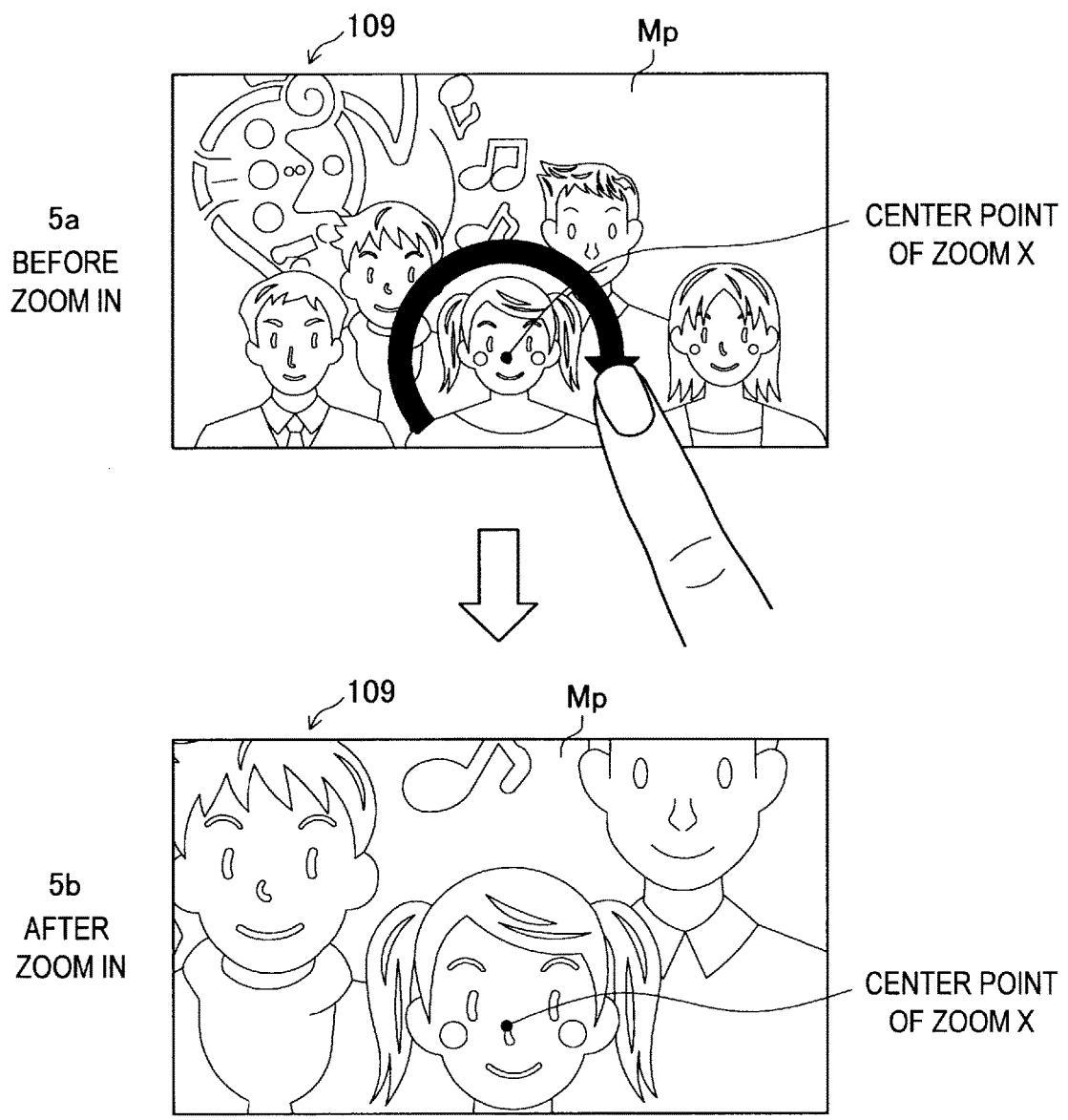
FIG. 5 is a schematic diagram showing a zoom in operation (1) in response to a touch operation.
Figure 6:
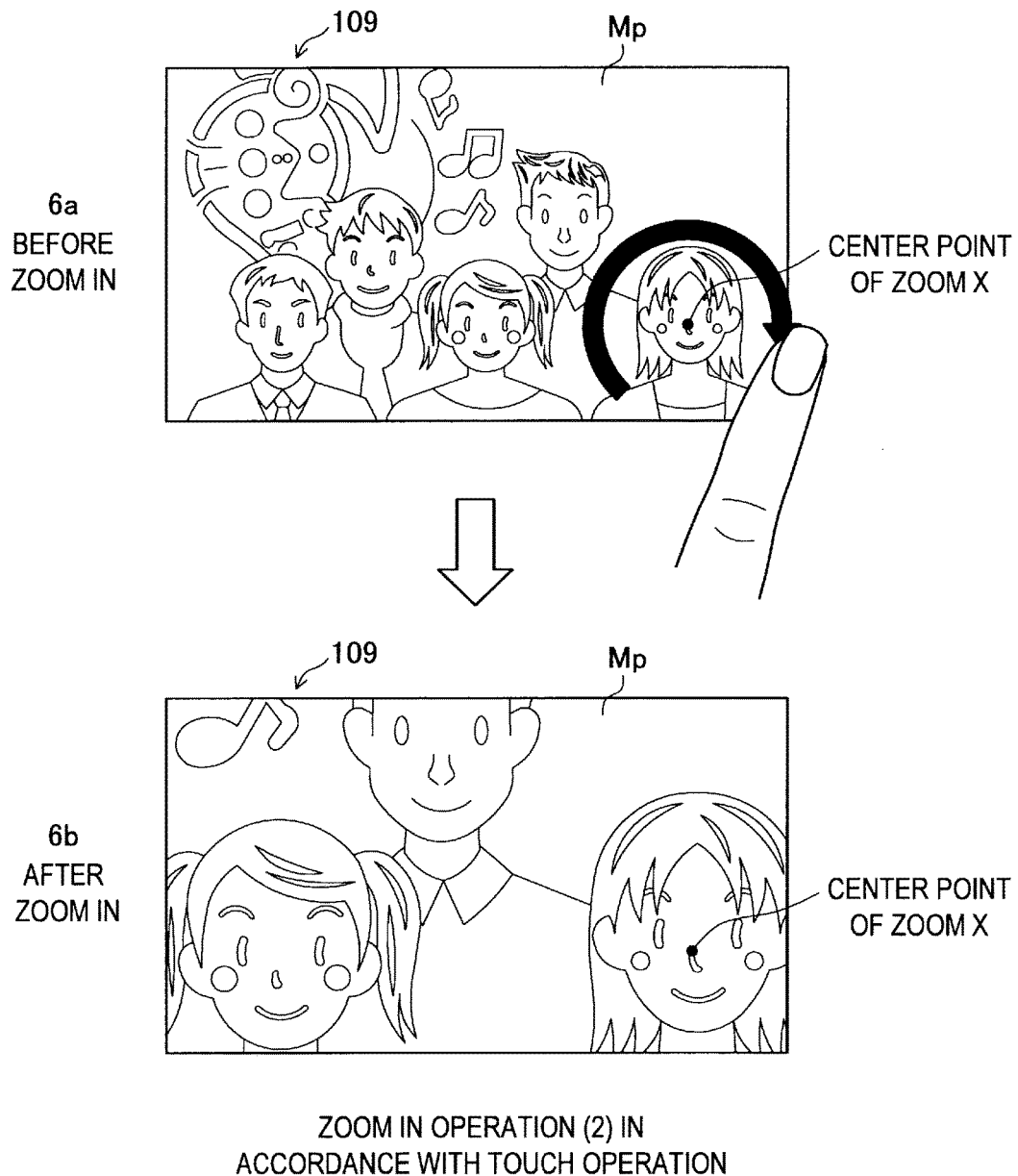
FIG. 6 is a schematic diagram showing a zoom in operation (2) in response to a touch operation.

Here, when a touch operation is performed on the touch screen 109 by moving a single finger such that a circle is traced on the monitoring image Mp, as shown in FIG. 5 and FIG. 6, the CPU 110 determines the touch operation to be the zoom operation, and performs the zoom operation.

At that time, if the circle is traced in the clockwise direction, for example, the CPU 110 makes the center point of the circle the center of the zoom (i.e., focal center), and performs a zoom in operation with a 2× zoom ratio per each circle. As a result, the monitoring image Mp being displayed on the touch screen 109 is scaled up centering on the center point of the traced circle.

On the other hand, if the circle is traced in the anti-clockwise direction, the CPU 110 makes the center point of the circle the center of the zoom, and performs a zoom out operation using with a 0.5× zoom ratio per each circle. As a result, the monitoring image Mp being displayed on the touch screen 109 is scaled down centering on the center point of the traced circle.

More specifically, the CPU 110 recognizes the trajectory when the touch position moves, by sequentially converting to the screen coordinates the coordinates of the touch position acquired from the input signal that is periodically transmitted from the touch screen 109 at the certain time interval (every few milliseconds, for example).

Note that, at a predetermined time interval (every few hundred milliseconds, for example), the CPU 110 recognizes the trajectory of the touch position based on the coordinates of the touch position acquired within the predetermined time interval.

Figure 7:
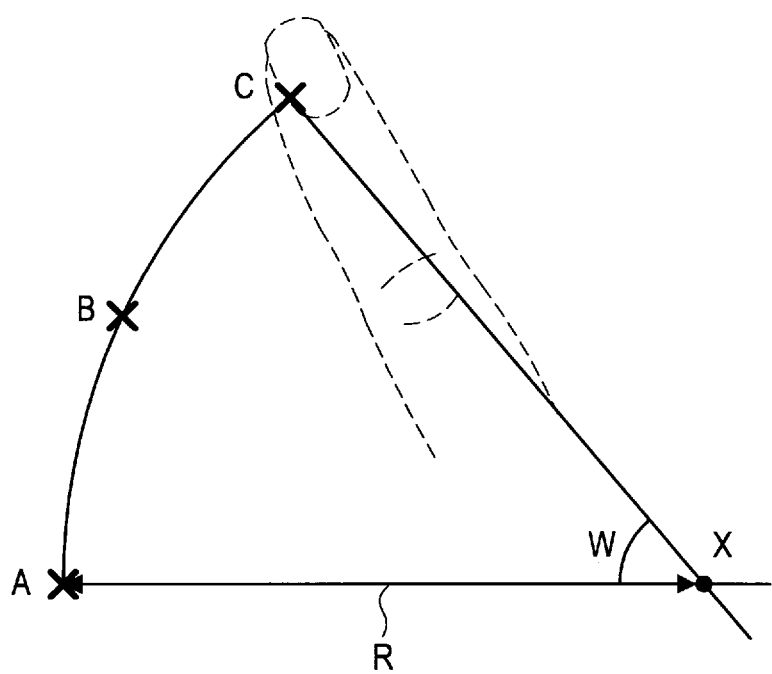
FIG. 7 is a schematic diagram illustrating calculation of a radius, a center point and a center angle of a circle from a trajectory of a touch position.

In this case, when the recognized trajectory of the touch position (namely, the trajectory of the finger on the monitoring image Mp) is a circular arc as shown in FIG. 7, the CPU 110 determines the touch operation to be the zoom operation.

In other words, if screen coordinates A, B and C of three points on the trajectory (a start point, an end point and a point between the start point and the end point, for example) are not positioned on a straight line, the CPU 110 determines that the trajectory is a circular arc, and that the touch operation is the zoom operation.

Based on the screen coordinates A, B and C of the three points on the circular arc, the CPU 110 then calculates screen coordinates X of a center point and a radius R of the circle (namely, the circle of which the circular arc is part) that passes through the three points. Here, the CPU 110 sets the calculated screen coordinates X of the center point of the circle as the zoom center point. Note that, as long as the center point of the circle does not move, the zoom center point is fixed as the screen coordinates X.

Furthermore, from the screen coordinates A, B and C of the three points, and from the radius R that is first calculated, the CPU 110 then calculates a center angle W of the circular arc. The center angle W represents a ratio of the traced amount (namely, the movement amount of the finger or the length of the circular arc) with respect to a circumference of the circle of which the circular arc is part. For example, if the center angle W is ninety degrees, this means that the length of the traced circular arc is one quarter of the circumference of the circle (three hundred and sixty degrees).

Based on the screen coordinates A, B and C of the three points, the CPU 110 additionally determines a direction in which the circular arc is traced (namely, whether it is traced in the clockwise or the anti-clockwise direction).

Then, from the direction in which the circular arc is traced and the center angle W of the traced circular arc, the CPU 110 sets a zoom type (zoom in or zoom out) and the zoom ratio.

For example, assuming that the circular arc is traced in the clockwise direction and the center angle W of the circular arc is ninety degrees, the CPU 110 sets the zoom type as zoom in and sets the zoom ratio as 1.25×. Further, assuming that the circular arc is traced in the anti-clockwise direction and the center angle W is one hundred and eighty degrees, the CPU 110 sets the zoom type as zoom out and sets the zoom ratio as 0.75×.

Based on the set screen coordinates X (the center point of the zoom), the zoom type and the zoom ratio, the CPU 110 then performs the zoom operation. Note that, in this case, one of either the optical zoom or the digital zoom may be used, or both the optical zoom and the digital zoom may be used.

For example, when the center point of the monitoring image Mp is set as the center point of the zoom, the optical zoom may be used, and when the center point of the zoom is displaced from the center point of the monitoring image Mp, the digital zoom may be used.

In this way, based on the center point of the traced circular arc, the amount of the circular arc traced and the direction in which it is traced, which are calculated from the trajectory of the touch position, the CPU 110 sets the screen coordinates X (the center point of the zoom), the zoom type and the zoom ratio, and then performs the zoom operation.

As a result, as shown in FIG. 5 and FIG. 6, the monitoring image Mp that is being displayed on the touch screen 109 is scaled up or scaled down centering on the screen coordinates X that are set as the center point of the zoom.

In this way, the CPU 110 performs the zoom operation based on the trajectory of the touch position when the touch operation is performed in which the finger is moved such that it traces the circle on the monitoring image Mp (namely, based on the trajectory of the finger on the monitoring image Mp).

Furthermore, while this type of touch operation is continued (namely, while the finger continues to move such that it traces the circle), the CPU 110 periodically recognizes the trajectory of the touch position at the predetermined time interval and performs the zoom operation based on the recognized trajectory of the touch position.

As a result, based on the trajectory of the finger on the monitoring image Mp, the monitoring image Mp being displayed on the touch screen 109 is scaled up or scaled down while changing the zoom center point and the zoom ratio substantially in real time.

For example, let us assume that the finger is moved such that it traces one circumference of a concentric circle in the clockwise direction. In this case, the monitoring image Mp is gradually scaled up centering on the center point of the traced circle, from 1×, through 1.25×, 1.5×, 1.75× to 2×.

Further, because the CPU 110 periodically recognizes the trajectory of the touch position at the predetermined time interval, the faster the speed at which the circle is traced (namely, the faster the movement speed of the finger), the greater the changes in the zoom ratio.

On the other hand, for example, when the finger is moved such that it traces the circle while changing the center point of the circle, the monitoring image Mp is scaled up or scaled down while moving the center point of the zoom.

The CPU 110 performs the zoom operation in this way when in the photo mode, in accordance with the touch operation in which the finger moves such that it traces the circle on the touch screen 109.

As described above, the DSC 100 recognizes the trajectory of the touch position traced by the single finger on the touch screen 109, and when the trajectory is circular, it determines that the touch operation has been performed in which the single finger is moved such that it traces the circle on the monitoring image Mp.

Then, based on the center point of the traced circle, the amount of the circle traced and the direction in which the circle is traced, which are calculated from the recognized trajectory of the touch position (namely, the trajectory of the finger), the DSC 100 sets the center point of the zoom, the zoom type and the zoom ratio and performs the zoom operation.

In this way, by the easy touch operation of simply tracing the circle with a selected area of the monitoring image Mp as the center with one finger, the DSC 100 can perform the zoom operation by causing a user to specify the center point of the zoom, the zoom type and the zoom ratio.

Further, in a similar manner, in the playback mode also, the CPU 110 of the DSC 100 scales up or scales down the playback image being displayed on the touch screen 109 in accordance with the touch operation in which the single finger is moved such that it traces the circle on the touch screen 109.

In other words, when switched to the playback mode, the CPU 110 displays the playback image on the touch screen 109.

Here, the CPU 110 recognizes the trajectory of the touch position on the touch screen 109 and when the trajectory is the circular arc, the CPU 110 determines that the touch operation has been performed in which the single finger moves such that it traces the circle on the playback image. Namely, it determines that the scaling up/scaling down operation has been performed.

Then, based on the center point of the traced circle, the amount of the circle traced, and the direction in which the circle is traced, which are calculated from the recognized trajectory of the touch position, the CPU 110 sets the center point of the scaling operation, sets whether to perform the scaling up operation or the scaling down operation and sets the scaling ratio. The CPU 110 then performs the scaling up or the scaling down of the displayed image.

In this way, by the easy touch operation of simply tracing the circle with a selected area of the displayed image as the center with the single finger, the DSC 100 can scale up or scale down the playback image by causing the user to specify the center point of the scaling operation, whether to perform the scaling up or the scaling down operation, and the scaling ratio.

1.5 Zoom Process Procedure

Figure 8:
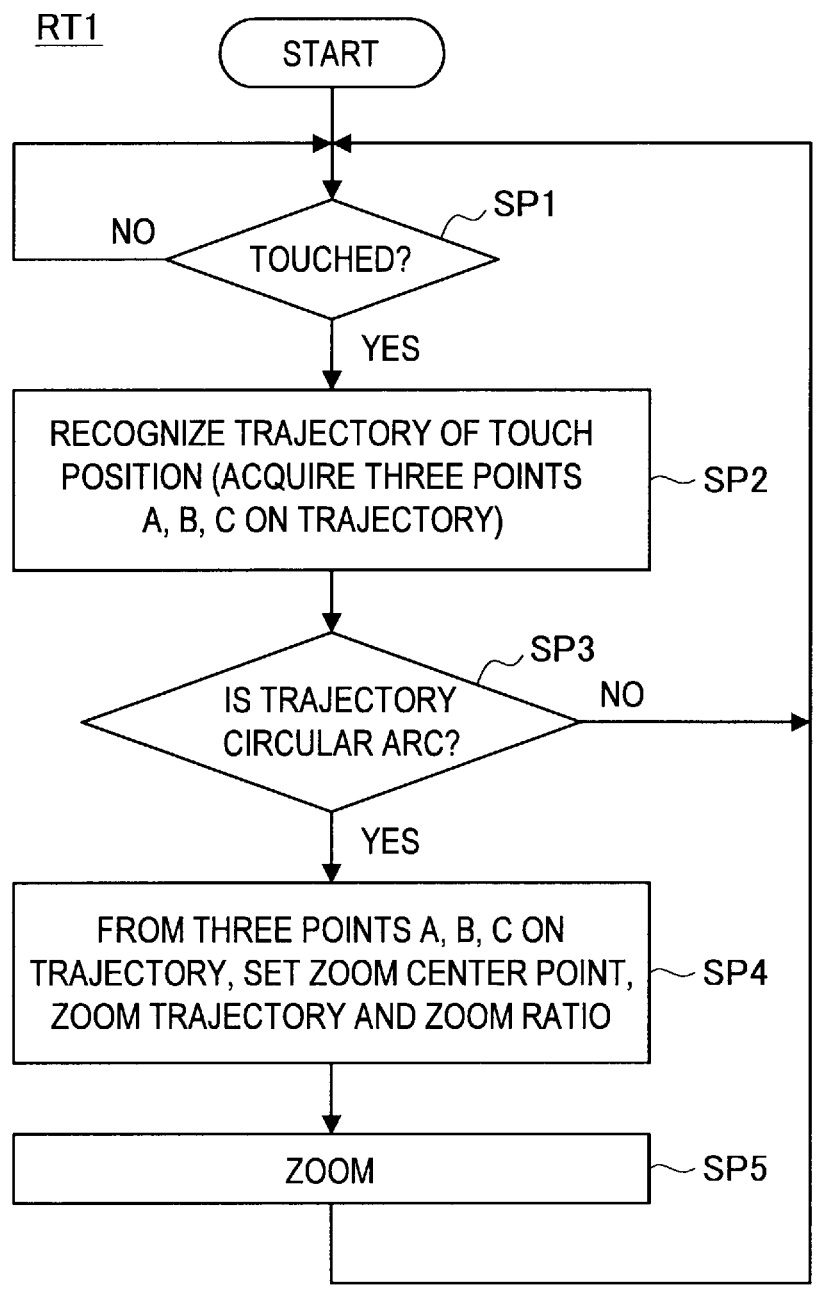
FIG. 8 is a flow chart showing a zoom process procedure.

Next, a process procedure (also referred to as a zoom process procedure) when performing the zoom operation in accordance with the above-described touch operation will be explained with reference to a flow chart shown in FIG. 8.

Note that a zoom process procedure RT1 is a process procedure executed by the CPU 110 of the DSC 100 in accordance with programs written into the program ROM 111.

It should be noted that a process procedure to perform scaling up/scaling down of the displayed image is similar to the zoom process procedure RT1, and an explanation is therefore omitted here.

When switched to the photo mode, the CPU 110 displays the monitoring image Mp on the touch screen 109 and also starts the zoom process procedure RT1, the process moving to step SP1.

At step SP1, based on the input signal transmitted from the touch screen 109, the CPU 110 waits for the touch screen 109 to be touched.

When an affirmative result is obtained at step SP1 by the touch screen 109 being touched by the finger of the user, the CPU 110 advances to the next step SP2.

At step SP2, based on the coordinates of the touch position obtained from the input signal periodically transmitted from the touch screen 109 at the certain time interval, the CPU 110 recognizes the trajectory of the touch position and obtains the screen coordinates A, B and C that are three points on the trajectory.

After obtaining the screen coordinates A, B and C of the three points on the trajectory in this way, the CPU 110 advances to the next step SP3.

At step SP3, based on positional relationships of the screen coordinates A, B and C of the three points on the trajectory, the CPU 110 determines whether or not the trajectory is the circular arc.

When an affirmative result is obtained at step SP3, this means that the trajectory is the circular arc, namely, that the zoom operation has been performed. At this time, the CPU 110 advances to step SP4.

At step SP4, based on the screen coordinates A, B and C of the three points on the trajectory, the CPU 110 sets the screen coordinates X that are the center point of the zoom, the zoom type and the zoom ratio, and then advances to step SP5.

At step SP5, the CPU 110 performs the zoom operation in accordance with the center point of the zoom, the zoom type and the zoom ratio set at step SP4, and then once more returns to step SP1.

On the other hand, when a negative result is obtained at the above-described step SP3, this means that the trajectory is not the circular arc and is, for example, a straight line, namely, that the zoom operation has not been performed. At this time, the CPU 110 returns once more to step SP1.

The DSC 100 performs the zoom operation by this type of zoom process procedure RT1.

1.6 Operation and Effects

With the above-described configuration, when switched to the photo mode, the DSC 100 displays the monitoring image Mp on the touch screen 109.

In this case, when the touch operation is performed on the touch screen 109 by the single finger, the DSC 100 recognizes the trajectory of the touch position.

Furthermore, when the trajectory is the circle, the DSC 100 determines that the zoom operation, in which the single finger is moved such that it traces the circle on the monitoring image Mp, has been performed.

Then, based on the center point of the traced circle, the amount of the circle traced and the direction in which the circle is traced, which are calculated from the trajectory of the touch position (namely, from the trajectory of the finger), the DSC 100 sets the center point of the zoom, the zoom type and the zoom ratio, and performs the zoom operation.

In this way, by the easy touch operation of simply tracing the circle with a selected area of the monitoring image Mp as the center with the single finger, the DSC 100 can perform the zoom operation by causing the user to specify the center point of the zoom, the zoom type and the zoom ratio.

In addition, when switched to the playback mode, the DSC 100 displays a playback image on the touch screen 109.

Then, in a similar manner to the photo mode, when the DSC 100 performs the scaling up/scaling down operation in which the finger is moved such that it traces the circle on the playback image, the DSC 100 sets the center point of the scaling operation, whether to perform scaling up or scaling down and the scaling ratio, and performs scaling of the displayed image in accordance with the scaling up/scaling down operation.

In this way, by the easy touch operation of simply tracing the circle with a selected area of the displayed image as the center with the single finger, the DSC 100 can perform the scaling operation by causing the user to specify the center point of the scaling operation, whether to perform scaling up or scaling down, and the scaling ratio.

In this way, the DSC 100 can perform the zoom operation and the scaling up/scaling down operation by the easy touch operation of simply tracing the circle with one finger, namely, by an easy single-touch operation.

Thus, operability of the DSC 100 at the time of the scaling up/scaling down operation can be further improved, in comparison to a case in which the scaling up/scaling down operation is performed by a multi-touch operation, such as by pinching in or pinching out.

Furthermore, as the zoom operation and the scaling up/scaling down operation can be performed using the single-touch operation in this way, the DSC 100 does not require a multi-touch compatible screen. In addition, hardware keys to perform the zoom operation and scaling up/scaling down operation are not needed.

As a result, it is possible to simplify the configuration of the DSC 100 in comparison to a case in which the multi-touch compatible screen and the hardware keys to perform the zoom operation and the scaling up/scaling down operation are provided.

Additionally, the DSC 100 sets the center point of the zoom, the zoom type and the zoom ratio based on the center point of the traced circle, the amount of the circle traced and the direction in which the circle is traced, using the touch operation that is performed only once.

As a result, the DSC 100 does not require a plurality of touch operations in which, for example, the center point of the zoom is specified by a first operation, and thereafter the zoom ratio is specified by a second touch operation. The DSC 100 can thus perform the scaling up/scaling down operation centering on a selected area using the touch operation that is performed only once.

With the above-described configuration, the DSC 100 can scale up or scale down the image by the easy touch operation of simply tracing the circle with the single finger (namely, by the single-touch operation), and thus operability at the time of the scaling up/scaling down operation can be further improved.

2. Second Embodiment

A second embodiment will next be explained. In the above-described first embodiment, when the finger is moved such that it traces the circle, the zoom ratio is set in accordance with the amount of the circle traced (namely, in accordance with a length of the circular arc).

In contrast, in the second embodiment, the zoom ratio is not set in accordance with the amount of the circle traced, but is set in accordance with a size of the circle traced.

Note that, the configuration of the DSC 100 is substantially the same as in the first embodiment, and the first embodiment is therefore referred to. Accordingly, here, only a zoom method is explained.

In a similar manner to the first embodiment, when switched to the photo mode, the CPU 110 displays the monitoring image Mp on the touch screen 109, as shown in FIG. 4.

Figure 9:
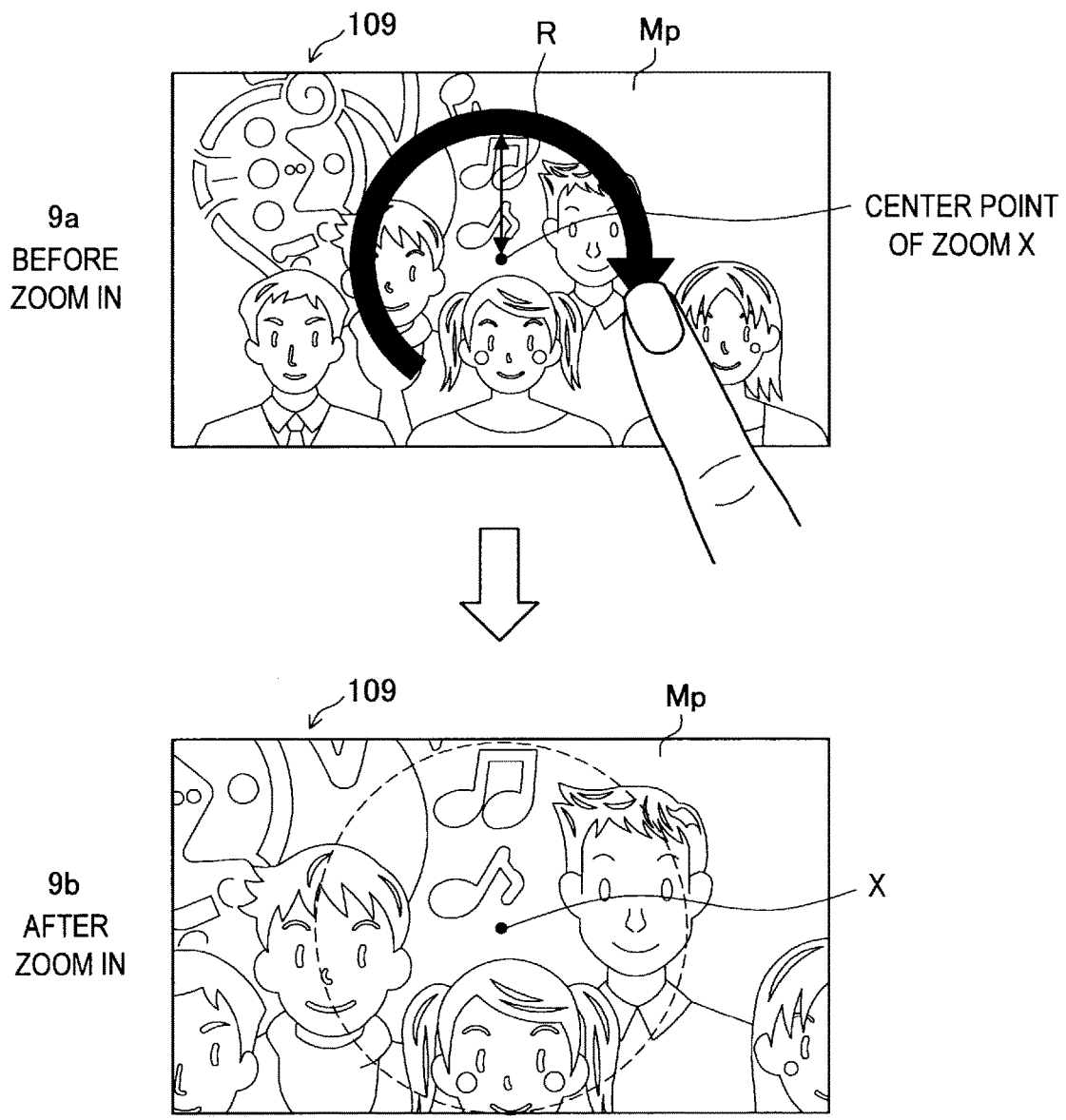
FIG. 9 is a schematic diagram showing a zoom in operation (1) in response to a touch operation according to a second embodiment.
Figure 10:
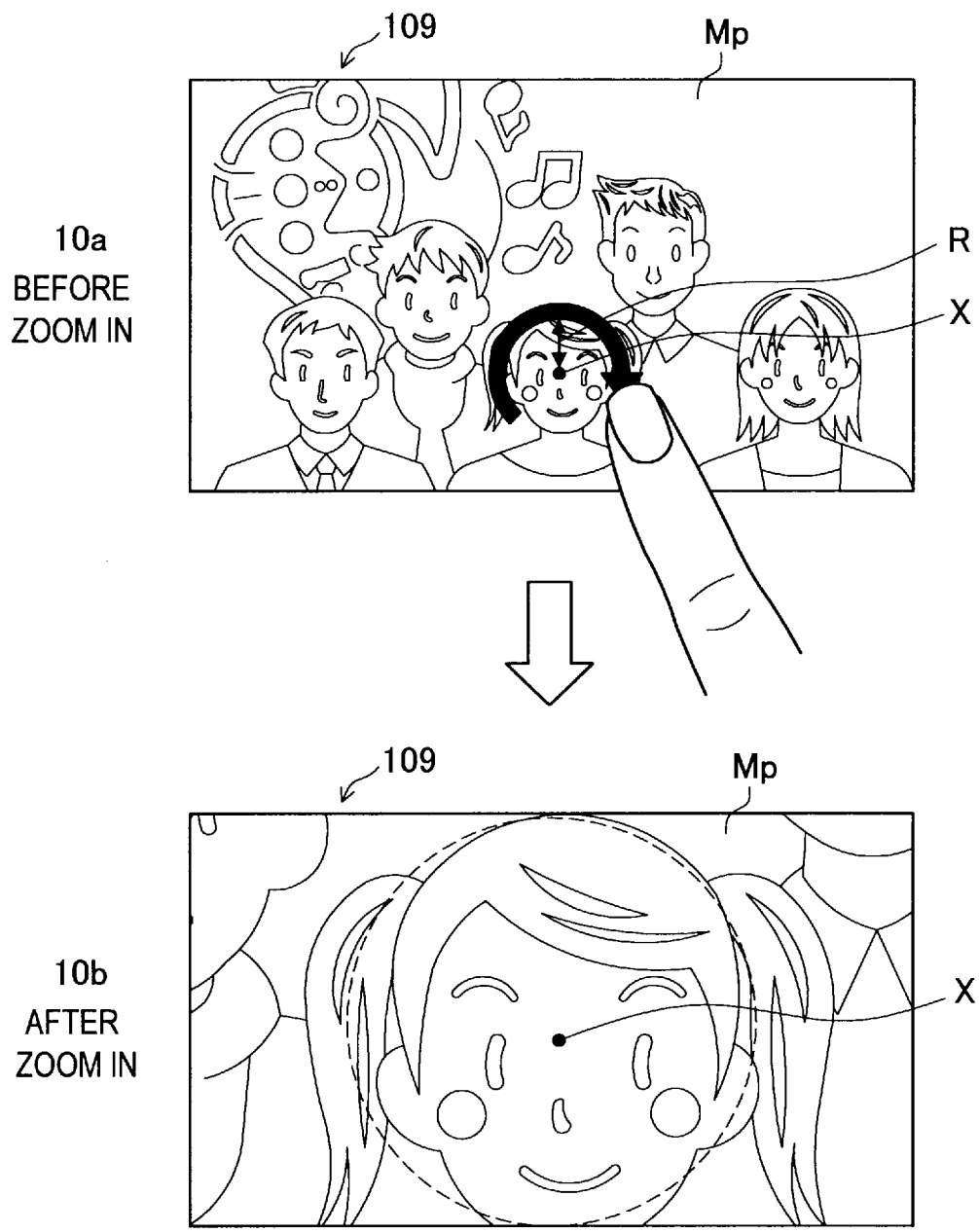
FIG. 10 is a schematic diagram showing a zoom in operation (2) in response to a touch operation according to the second embodiment.

Here, as shown in FIG. 9 and FIG. 10, the CPU 110 performs the zoom in operation when the touch operation is performed in which the finger is moved on the touch screen 109 such that it traces the circle in the clockwise direction on the monitoring image Mp.

At this time, the CPU 110 performs the zoom in operation such that a section that forms an inside of the traced circle on the monitoring image Mp being displayed is displayed such that it fills a display area of the touch screen 109.

As a result, the monitoring image Mp being displayed on the touch screen 109 is scaled up such that the section that forms the inside of the traced circle is displayed filling the display area of the touch screen 109.

More specifically, from the trajectory of the touch position, the CPU 110 calculates the screen coordinates X of the center point and the radius R of the traced circle. The CPU 110 then sets the calculated screen coordinates X of the center point of the circle as the center point of the zoom.

In addition, from the calculated screen coordinates X of the center point of the circle and the calculated radius R of the circle, the CPU 110 identifies, on the monitoring image Mp, the section that forms the inside of the traced circle.

Based on the radius R of the traced circle and a size of the display area of the touch screen 109, the CPU 110 then sets the zoom ratio such that the section inside the traced circle is scaled up to fill the display area, and performs the zoom in operation.

In this case, as shown in FIG. 9 and FIG. 10, the larger the radius R of the traced circle, the smaller the zoom ratio set by the CPU 110, and the smaller the radius R of the traced circle, the larger the zoom ratio set by the CPU 110.

Figure 11:
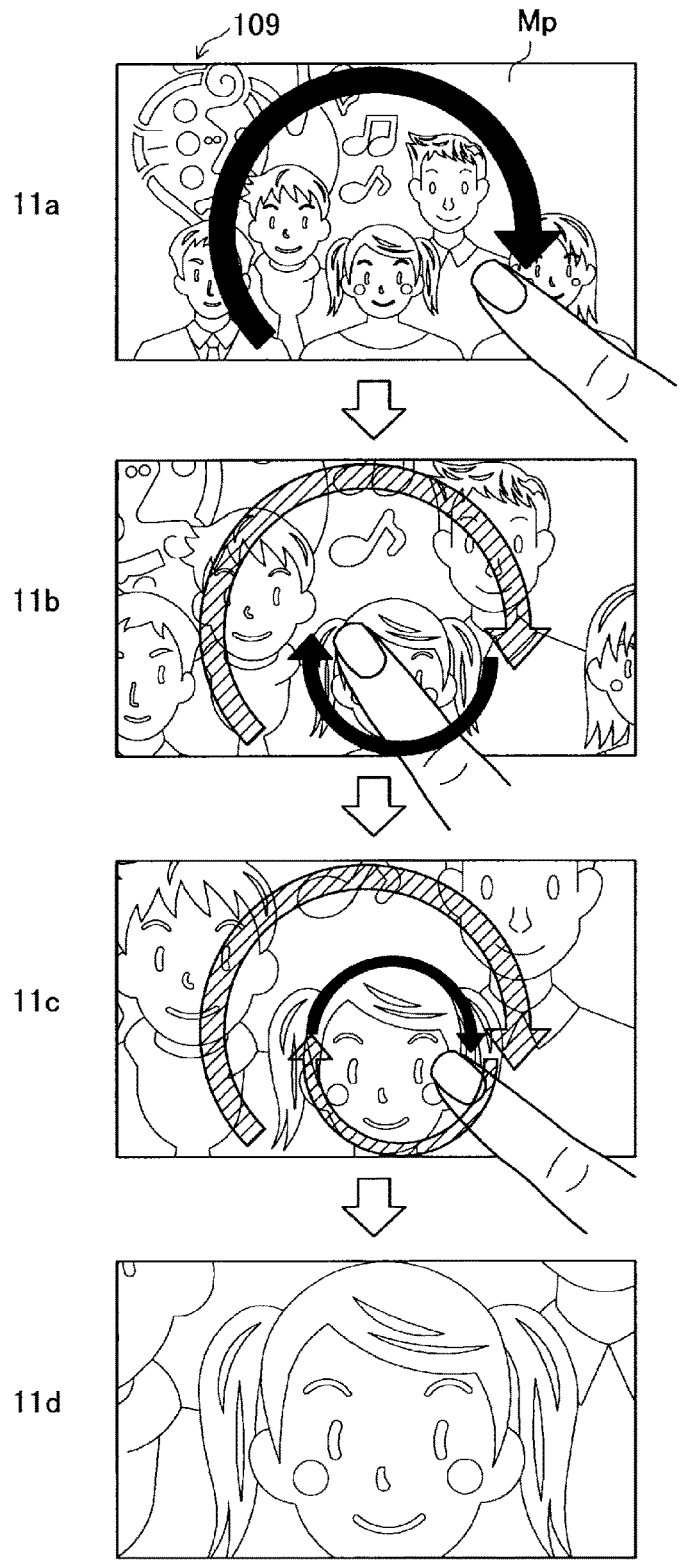
FIG. 11 is a schematic diagram showing zoom changes when a size and a center of the circle are changed.

Accordingly, as shown in FIG. 11, for example, by gradually tracing smaller circles, the user can gradually zoom in while narrowing down the section he or she wishes to scale up.

For example, let us assume that the user is concentrating on a face of a girl in a center of the monitoring image Mp. First, as shown in FIG. 11, the user traces a larger circle that encloses the face of the girl and other sections also. By doing this, a general section that includes the face of the girl is scaled up (refer to 11a).

Further, while making the traced circle smaller, the user displaces the center of the traced circle such that the center of the traced circle becomes the center of the face of the girl (refer to 11b and FIG. 11c).

As a result, finally, the face of the girl is scaled up such that it is displayed filling the display area (refer to FIG. 11d).

As described above, when the touch operation is performed on the touch screen 109 in which the circle is traced by the finger in the clockwise direction on the monitoring image Mp, the DSC 100 determines that the zoom in operation has been performed.

The DSC 100 then performs the zoom in operation such that the section inside the traced circle on the monitoring image Mp is displayed filling the display area of the touch screen 109.

In this way, by the easy touch operation of simply tracing the circle that encloses a selected area on the monitoring image Mp, the DSC 100 can perform the zoom in operation such that the selected area is displayed filling the display area of the touch screen 109.

Note that, here, the explanation is given for the zoom in operation. The zoom out operation is substantially the same as that of the first embodiment, and an explanation is thus omitted here.

Additionally, when switched to the playback mode also, in a similar manner to the zoom in operation when in the photo mode, the DSC 100 can perform the scaling up operation such that a selected area of the displayed image is displayed filling the display area of the touch screen 109.

Further, with respect to the zoom process procedure, the zoom settings performed at step SP4 of the zoom process procedure RT1 of the first embodiment may be changed to the settings explained in the second embodiment.

In other words, at step SP4, the CPU 110 may set the center point of the zoom and the zoom ratio based on the screen coordinates X of the center point of the traced circle, the radius R of the traced circle and the size of the display area of the touch screen 109.

3. Other Embodiments

3.1 Other Embodiment 1

In the above-described first and second embodiments, when in the playback mode, when the touch operation is performed in which the finger is moved to trace the circle in the clockwise direction, the CPU 110 of the DSC 100 scales up the playback image being displayed on the touch screen 109.

At this time, a section that is outside the traced circle on a displayed playback image Sp may remain the same and a section that is inside the traced circle may be scaled up, as shown in FIG. 12.

More specifically, when the touch operation is performed in which the finger is moved to trace the circle in the clockwise direction, the CPU 110 identifies the section inside the traced circle on the playback image Sp.

The CPU 110 then scales up the section inside the traced circle, centering on the screen coordinates X that are the center point of the traced circle, and using a scale-up ratio corresponding to the amount of the circle traced. Further, the CPU 110 trims sections that extend outside the circle, from the image of the scaled up section.

As a result, only the section inside the traced circle on the playback image Sp being displayed on the touch screen 109 is scaled up and displayed inside the circle, centering on the center point of the traced circle.

In addition, for example, let us assume that the touch screen 109 of the DSC 100 is multi-touch compatible, and that the touch operation shown in FIG. 13 is performed, in which two circles are simultaneously traced by moving two fingers.

In this case, the CPU 110 may leave sections that are outside the two circles as they are, and may scale up sections that respectively form the inside of the two simultaneously traced circles.

The present invention is not limited to these examples, and, when a plurality of circles is traced sequentially, sections that form insides of the sequentially traced plurality of circles may be sequentially scaled up.

3.2 Other Embodiment 2

Further, in the above-described first and second embodiments, when the touch operation is performed in which the finger is moved such that it traces the circle, the touch operation is determined to be the zoom operation and the zoom operation is performed.

However, the present invention is not limited to this example, and, as shown in FIG. 14, when a touch operation is performed in which the monitoring image Mp is lightly brushed by a finger (a flick), and a flick operation is determined by the CPU 110 from a trajectory of the finger, the CPU 110 may recognize that the zoom in operation has been performed and perform the zoom in operation.

More specifically, the CPU 110 recognizes the trajectory of the flick, sets the screen coordinates X of a starting point of the flick as a center point of the zoom, and also sets a zoom ratio in accordance with a speed of the flick (speed of movement of the finger).

At this time, for example, the zoom ratio is set such that the faster the speed of the flick, the higher the zoom ratio set by the CPU 110.

In this way, by the easy touch operation of taking a selected section on the monitoring image Mp as the starting point and performing the flick at a selected speed, the DSC 100 can perform the zoom in operation by causing the user to specify the center point of the zoom and the zoom ratio.

Note that, when in the playback mode also, the DSC 100 can scale up the display image by causing the flick operation to be performed in a similar manner to the zoom in operation in the photo mode.

Additionally, the invention is not limited to the example of the circle, and a touch operation in which the finger is moved to trace another shape, such as a triangle or a square may be determined as the zoom operation and the zoom operation may be performed accordingly. In this case also, in a similar manner to the case of the circle, the CPU 110 calculates from the trajectory of the touch position (namely, the trajectory of the finger) the center point of the shape, the amount of the shape traced and the direction in which the shape is traced, and, based on these, the CPU 110 sets the center point of the zoom, the zoom type and the zoom ratio. The CPU 110 then performs the zoom operation accordingly. However, in the case of a shape in which it is difficult to calculate a center point when the shape is only partially traced, such as with the triangle etc., the center point may be calculated at a time point at which a single closed shape is traced.

3.3 Other Embodiment 3

In addition, in the above-described first embodiment, the CPU 110 performs the zoom operation at the zoom ratio corresponding to the length of the traced circular arc at the predetermined time interval.

The invention is not limited to this example, and the CPU 110 may perform the zoom operation every time a length of the traced circular arc reaches, for example, a quarter of the circumference of the circle, using a quarter of the zoom ratio of a full circumference.

Further, every time the length of the traced circular arc reaches the length of the circumference of the circle, for example, namely, every time a single circle is traced, the zoom operation may be performed at the zoom ratio of the full circumference.

By doing this, it is possible to perform control such that the zoom operation is not performed until the traced circular arc reaches a predetermined length, and mistaken operation can thus be inhibited, such as performing the zoom operation when the touch screen 109 is mistakenly touched, for example.

The invention is not limited to this example, and the zoom ratio may be set not in accordance with the length of the traced circular arc, but in accordance with a speed at which the circular arc is traced.

3.4 Other Embodiment 4

Furthermore, in the above-described embodiments, the DSC 100 that is the information processing device is provided with the lens portion 118 and the image pickup element 120 as the image pickup portion. The DSC 100 is further provided with the liquid crystal panel 115 as the display portion. The DSC 100 is further provided with the touch panel 113 as the position detecting portion. The DSC 100 is further provided with the CPU 110 as the trajectory recognition portion, the setting portion and the control portion.

The present invention is not limited to this, and as long as they have the same functions, each of the above-described functional portions of the DSC 100 may be formed by other various hardware or software. For example, in place of the touch screen 109 that is formed by the liquid crystal panel 115 and the touch panel 113, the DSC 100 may be provided with a liquid crystal panel etc. that has touch panel functions. Further, in place of the liquid crystal panel 115, the DSC 100 may be provided by another display device, such as an organic EL (Electro-Luminescence) device etc.

Further, in the above-described embodiments, the present invention is applied to the DSC 100. However, the present invention is not limited to this, and may be and can be applied to a variety of devices, including a digital video camera, a personal computer, a mobile telephone etc., as long as the device has a display device on which a touch operation is possible, such as the touch screen 109 etc.

For example, the present invention may be applied to a navigation device that displays a map image. By applying the present invention to the navigation device, the navigation device can perform a scaling up/scaling down operation, centering on a selected section on the map image, by a single touch operation using one finger.

3.5 Other Embodiment 5

Furthermore, in the above-described embodiments, the program used to execute each of the various processes is written into the program ROM 111 of the DSC 100.

The present invention is not limited to this example, and the program may be, for example, recorded in advance on a recording medium such as a memory card, and the CPU 110 of the DSC 100 may read the program from the recording medium and execute it. Alternatively, the program read from the recording medium may be installed in the EEPROM 125.

3.6 Other Embodiment 6

Furthermore, the present invention is not limited to the above-described first and second embodiments and the other embodiments. In other words, the scope of the present invention embraces a chosen combination of part or all of the above-described first, second and other embodiments, or an extraction of part of the above-described embodiments.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-121106 filed in the Japan Patent Office on May 19, 2009.

This invention can be widely applied to devices having a touch screen, for example.

The invention claimed is:

1. A digital image processing device, comprising:
   circuitry configured to:
   identify a gesture of a user based on data output from a sensor; and
   control a display to perform a zoom operation on an image displayed by the display based on a degree of a center angle of a curved path corresponding to the entire gesture, the curved path corresponding to a part of a circle, wherein
   a zoom ratio of the zoom operation corresponds to the degree of the center angle of the curved path,
   a center of the zoom operation in the image with respect to the display remains constant from before to after the zoom operation,
   the gesture includes a continuous touch operation of the user including a plurality of distinct touch positions on the display and along the curved path,
   when a center point of the curved path is at a center point of the image, the zoom operation is an optical zoom, and
   when the center point of the curved path is displaced from the center point of the image, the zoom operation is a digital zoom.

2. The digital image processing device of claim 1, wherein the digital image processing device is a navigation device.

3. The digital image processing device of claim 1, wherein the gesture is a partial outline of an area of the displayed image.

4. The digital image processing device of claim 3, wherein the partial outline is the curved path.

5. The digital image processing device of claim 4, wherein the curved path is defined by at least three distinct touch positions.

6. The digital image processing device of claim 3, wherein initiation of the partial outline by the user in a first direction defines a zoom-in, zoom operation.

7. The digital image processing device of claim 3, wherein initiation of the partial outline by the user in a second direction defines a zoom-out, zoom operation.

8. The digital image processing device of claim 3, wherein the zoom ratio is based on a length of the partial outline.

9. The digital image processing device of claim 8, wherein the length is defined by predetermined increment portions, and the degree of the zoom operation is varied in accordance with a number of increment portions forming the length of the gesture.

10. The digital image processing device of claim 1, wherein the gesture is a complete outline of an area of the displayed image, and upon the user continuously retracing the complete outline, the zoom ratio is varied upward or downward depending upon a direction of the retrace.

11. The digital image processing device of claim 3, wherein the partial outline is used to delineate areas of the displayed image that are to be excluded from the zoom operation.

12. The digital image processing device of claim 3, wherein the zoom operation provides a zoom overlay of only a designated image area relative to the displayed image.

13. The digital image processing device of claim 1, further comprising:
the display.

14. The digital image processing device of claim 1, wherein the sensor is a touch sensor, and the circuitry is configured to identify the continuous touch operation based on an output of the touch sensor.

15. The digital image processing device of claim 1, wherein the circuitry is configured to control the display to perform the zoom operation on the image displayed by the display in proportion to the center angle of the curved path corresponding to the gesture.

16. The digital image processing device of claim 1, wherein the zoom operation is a zoom-in operation or a zoom-out operation.

17. The digital image processing device of claim 1, wherein the entire gesture corresponds to a single touch operation from beginning to end.

18. The digital image processing device of claim 1, wherein
the entire gesture includes a plurality of continuous gestures, and
the circuitry is configured to control the display to perform a plurality of zoom operations on an image displayed by the display based on the degree of the center angle of the curved path corresponding to each of the plurality of continuous gestures.

19. The digital image processing device of claim 1, wherein
the entire gesture includes a plurality of continuous gestures, and
the circuitry is configured to control the display to perform a zoom operation on an image displayed by the display based on the degree of the center angle of the curved path corresponding to at least one of the plurality of continuous gestures.

20. The digital image processing device of claim 1, wherein
the zoom ratio is based upon a speed at which the gesture is completed, and
a faster the speed, a greater a change in the zoom ratio.

21. A digital image processing device, comprising:
means for identifying a touch gesture of a user based on data output from a sensor; and
means for controlling a display to perform a zoom operation on an image displayed by the display based on a degree of a center angle of a curved path corresponding to the entire gesture, the curved path corresponding to a part of a circle, wherein
a zoom ratio of the zoom operation corresponds to the degree of the center angle of the curved path,
a center of the zoom operation in the image with respect to the display remains constant from before to after the zoom operation,
the gesture includes a continuous touch operation of the user including a plurality of distinct touch positions on the display and along the curved path,
when a center point of the curved path is at a center point of the image, the zoom operation is an optical zoom, and
when the center point of the curved path is displaced from the center point of the image, the zoom operation is a digital zoom.

22. The digital image processing device of claim 21, wherein the zoom operation is a zoom-in operation or a zoom-out operation.

23. A method of processing a digital image at a digital image processing device, comprising:
identifying a gesture of a user based on data output from a sensor; and
controlling a display to perform a zoom operation on an image displayed by the display based on a degree of a center angle of a curved path corresponding to the entire gesture, the curved path corresponding to a part of a circle, wherein
a zoom ratio of the zoom operation corresponds to the degree of the center angle of the curved path,
a center of the zoom operation in the image with respect to the display remains constant from before to after the zoom operation,
the gesture includes a continuous touch operation of the user including a plurality of distinct touch positions on the display and along the curved path,
when a center point of the curved path is at a center point of the image, the zoom operation is an optical zoom, and
when the center point of the curved path is displaced from the center point of the image, the zoom operation is a digital zoom.

24. The digital image processing method of claim 23, wherein the digital image processing device is a navigation device.

25. The digital image processing method of claim 23, wherein the gesture is a partial outline of an area of the displayed image.

26. The digital image processing method of claim 25, wherein the partial outline is the curved path.

27. The digital image processing method of claim 26, wherein the curved path is defined by at least three distinct touch positions.

28. The digital image processing method of claim 25, wherein initiation of the partial outline by the user in a first direction defines a zoom-in, zoom operation.

29. The digital image processing method of claim 25, wherein initiation of the partial outline by the user in a second direction defines a zoom-out, zoom operation.

30. The digital image processing method of claim 25, wherein the zoom ratio is based on a length of the partial outline.

31. The digital image processing method of claim 30, wherein the length is defined by predetermined increment portions, and the degree of the zoom operation is varied in accordance with a number of increment portions forming the length of the gesture.

32. The digital image processing method of claim 23, wherein the gesture is a complete outline of an area of the displayed image, and upon the user continuously retracing the complete outline, the method further comprising:

varying the zoom ratio upward or downward depending upon a direction of the retrace.

33. The digital image processing method of claim 25, wherein the partial outline is used to delineate areas of the displayed image that are to be excluded from the zoom operation.

34. The digital image processing method of claim 23, wherein the zoom operation provides a zoom overlay of only a designated image area relative to the displayed image.

35. The digital image processing method of claim 23, wherein the zoom operation is a zoom-in operation or a zoom-out operation.

36. A non-transitory computer readable storage medium encoded with computer program instructions for causing a digital imaging processing device to implement a method of digital image processing, comprising:

identifying a gesture of a user based on data output from a sensor; and controlling a display to perform a zoom operation on an image displayed by the display based on a degree of a center angle of a curved path corresponding to the entire gesture, the curved path corresponding to a part of a circle, wherein a zoom ratio of the zoom operation corresponds to the degree of the center angle of the curved path, a center of the zoom operation in the image with respect to the display remains constant from before to after the zoom operation, the gesture includes a continuous touch operation of the user including a plurality of distinct touch positions on the display and along the curved path, when a center point of the curved path is at a center point of the image, the zoom operation is an optical zoom, and when the center point of the curved path is displaced from the center point of the image, the zoom operation is a digital zoom.

37. The non-transitory computer readable storage medium of claim 36, wherein the zoom operation is a zoom-in operation or a zoom-out operation.

* * * * *